United States Patent [19]
Ohtomo et al.

[11] Patent Number: 5,585,623
[45] Date of Patent: Dec. 17, 1996

[54] METHOD AND APPARATUS FOR DETECTING A LIGHT SIGNAL IN THE PRESENCE OF NOISE

[75] Inventors: Fumio Ohtomo; Kenichiro Yoshino, both of Tokyo, Japan

[73] Assignee: Kabushiki Kaisha Topcon, Tokyo, Japan

[21] Appl. No.: 395,884

[22] Filed: Feb. 28, 1995

[30] Foreign Application Priority Data

Mar. 1, 1994 [JP] Japan .................................. 6-031039

[51] Int. Cl.$^6$ ............................................. H01J 40/14
[52] U.S. Cl. .................... 250/214 R; 250/214 C; 359/162; 327/551
[58] Field of Search ........................ 250/214 R, 214 LA, 250/214.1, 214 B, 214 C, 551; 359/158, 191, 162, 152, 154, 181–187; 327/113, 514, 515, 530, 535, 560, 551

[56] References Cited

U.S. PATENT DOCUMENTS

| | | | |
|---|---|---|---|
| 4,789,837 | 12/1988 | Ridgers | 327/113 |
| 4,903,339 | 2/1990 | Solomon | 359/162 |
| 5,422,752 | 6/1995 | Hardcastle | 359/191 |

*Primary Examiner*—Edward P. Westin
*Assistant Examiner*—Que T. Le
*Attorney, Agent, or Firm*—Finnegan, Henderson, Farabow, Garrett & Dunner, L.L.P.

[57] ABSTRACT

An apparatus for detecting a light signal is provided which includes a first frequency source for generating a clock signal having a fixed frequency, a light emitting portion constituted of at least a light emitting element which is driven based on the clock signal of the first frequency source and emits a light signal, and a light receiving portion disposed apart from the light emitting portion. The light receiving portion includes a light receiving element which receives the light signal emitted from the light emitting element, an amplifying circuit which amplifies the light signal received by the light receiving element, a converter which converts an analog signal given from the amplifying circuit into a digital signal, a second frequency source for generating a clock signal having a fixed frequency, and a summing portion which samples the digital signals given from the converter synchronously with the second frequency source plural times at regular intervals during at least one period of the light signal and then, during a plurality of the periods of the light signal, sums sampled values obtained in turn during the one period.

8 Claims, 3 Drawing Sheets

METHOD AND APPARATUS FOR DETECTING A LIGHT SIGNAL IN THE PRESENCE OF NOISE

BACKGROUND OF THE INVENTION

1. Field of the Invention

This invention relates to an apparatus for detecting a light signal drowned in noises.

2. Description of the Prior Art

A light signal detecting apparatus is known in which light as a signal is emitted from a light emitting portion, is received by a light receiving element disposed several meters to ten-odd meters apart from the light emitting portion, is converted into an electric signal, and is amplified for detection. In this conventional apparatus, modulation light of which the duty ratio is 50% is used as the light signal. Further, in the apparatus, a narrow-band filter, a phase-lock loop, etc., are used to enhance the detectability of the light signal.

However, the apparatus needs to receive a light signal larger in amplitude than noises peculiar to the apparatus or noises caused by disturbance light in spite of the enhancement of the detectability by means of, for example, the narrow-band filter and the phase-lock loop. In other words, the apparatus makes it a condition that the light signal received by the light receiving element is in a state of separation from noises, and therefore the light emitting portion needs to deliver a high output. That is, a fault in the conventional apparatus is that it is difficult to detect the light signal buried or drowned in the noises (i.e., light signal having a signal-to-noise ratio below 1).

It is therefore an object of the present invention to provide a light signal detecting apparatus capable of detecting a light signal having a signal-to-noise ratio (S-N ratio) below 1.

SUMMARY OF THE INVENTION

To achieve the object, the light signal detecting apparatus according to the present invention comprises a first frequency source for generating a clock signal having a given frequency, a light emitting portion constituted of at least a light emitting element which emits a light signal in accordance with the clock signal of the first frequency source, a light receiving element which is disposed apart from the light emitting portion and receives the light signal from the light emitting element, an amplifying circuit which amplifies the light signal received by the light receiving element, a converter which converts an analog signal given from the amplifying circuit into a digital signal, a second frequency source for generating a clock signal having a given frequency, and a light receiving portion including a summing portion which samples the digital signal given from the converter synchronously with the second frequency source plural times at regular intervals during at least one period of the light signal and, during a plurality of the periods of the light signal, sums up values sampled in turn during the one period.

According to the light signal detecting apparatus of the present invention, the light emitting element of the light emitting portion is caused to emit light as a pulse signal at given intervals from the first frequency source. The light receiving element receives the pulse signal from the light emitting element. The signal received by the light receiving element is amplified by the amplifying circuit and then is converted from analog to digital. The resultant digital signal is input to the summing portion. The summing portion obtains a summed value such that the digital signal is sampled synchronously with the frequency of the second frequency source plural times at regular intervals during at least one period of the light signal and, during a plurality of the periods of the light signal, values sampled in turn during the one period are summed up.

In case of no pulse signal, a signal is generated in which a noise component is superimposed on a bias component of a circuit. But, by summation, the noise component occurring at random is converged on a given level and, as a result, only the bias component appears. On the other hand, if there is a pulse signal, a signal waveform is obtained in which a component relative to the pulse signal is added to the bias component. For this reason, the summation of a signal based on the pulse signal enables the pulse signal to become discernible. Therefore, according to the light signal detecting apparatus, the light signal having a S-N ratio below 1 (light signal drowned in noises) can be certainly detected. Further, the output of the light emitting portion can be lessened. Further, the duty ratio of the light signal as a rectangular pulse can be made less than 50%, and therefore advantages, such as the reduction of the power consumption of the light emitting portion, can be obtained.

DETAILED DESCRIPTION OF THE PREFERRED EMBODIMENT

One embodiment of a light signal detecting apparatus according to the present invention will be hereinafter described with reference to the attached drawings.

Figure 1:
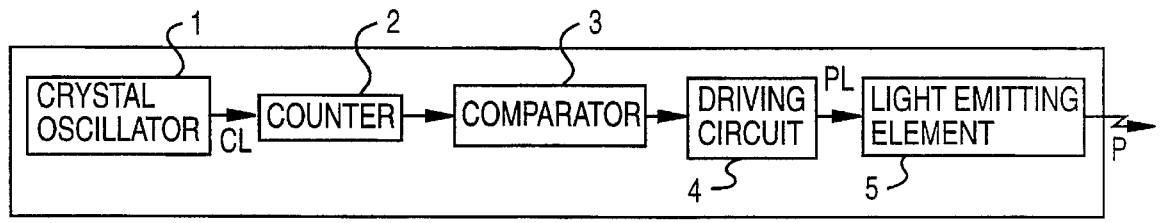
FIG. 1 is a circuit diagram of the light emitting portion of the light signal detecting apparatus according to the present invention.
Figure 2A:
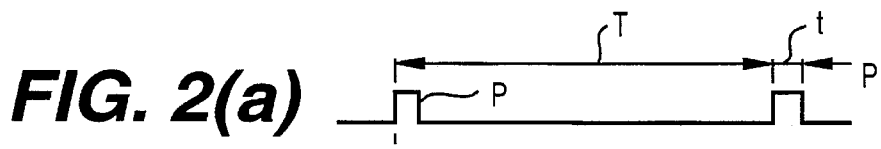
FIGS. 2(a)–2(g) are timing charts of the light signal detecting apparatus.

In FIG. 1, reference numeral 1 designates a high-stable crystal oscillator as a first frequency source. The crystal oscillator 1 outputs a reference clock signal CL having a given frequency. The reference clock signal CL is input to a counter 2 and is divided thereby. A divided output is input to an equal comparator 3. The equal comparator 3 generates an output signal when the counter 2 has a predetermined value. According to the reference clock signal CL, the equal comparator 3 outputs a rectangular pulse PL having a duty ratio less than 50%. The rectangular pulse PL is input to a driving circuit 4. According to the rectangular pulse PL, the driving circuit 4 controls and causes a light emitting element 5 to emit light. FIG. 2(a) shows a light signal P output from the light emitting element 5.

Figure 2B:
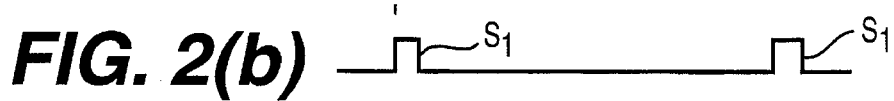
Figure 2C:
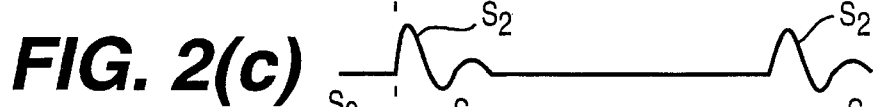
Figure 3:
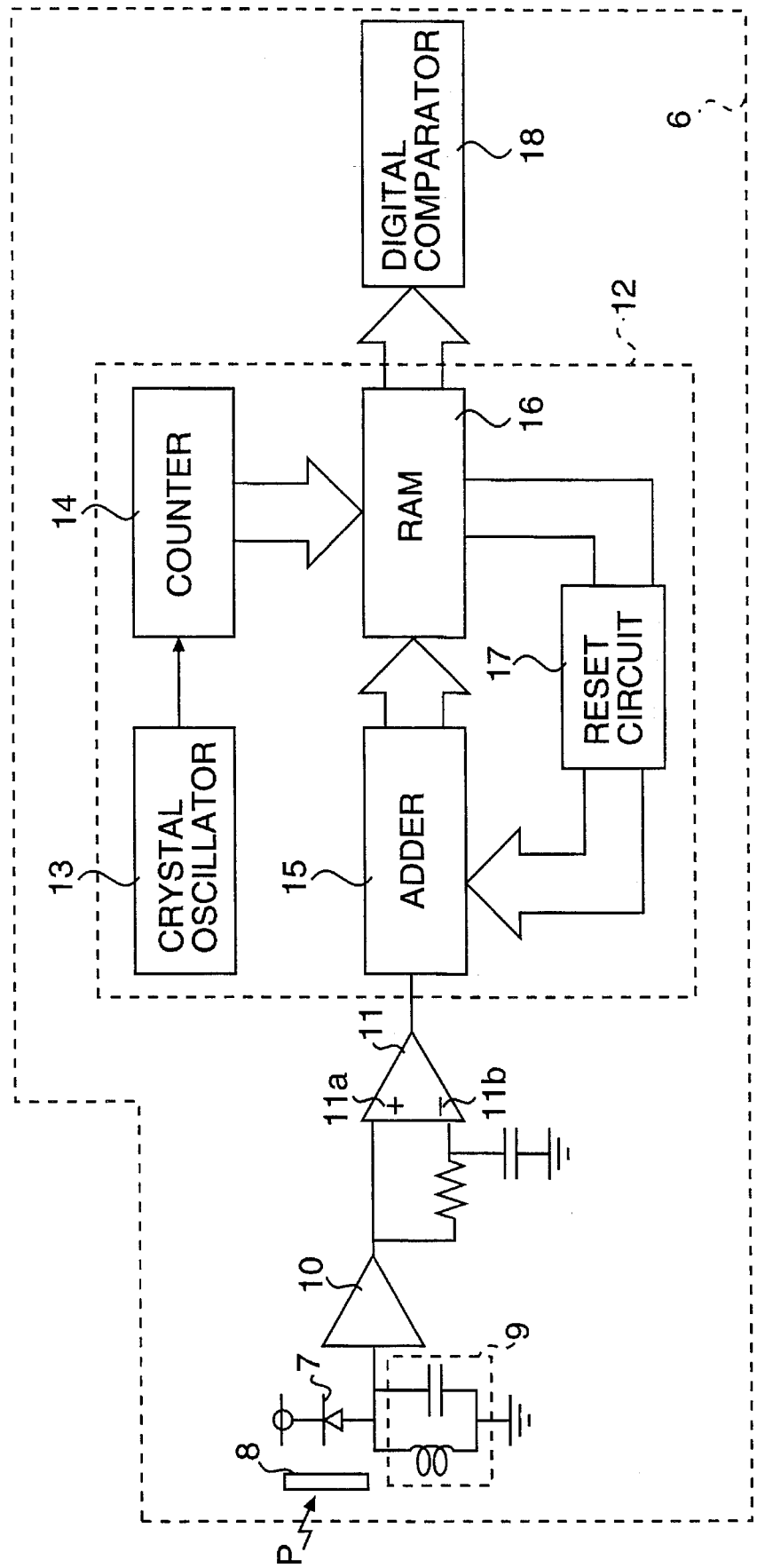
FIG. 3 is circuit diagram of the light receiving portion of the light signal detecting apparatus.

The light signal P is received by a light receiving element 7 of a light receiving portion 6 shown in FIG. 3. An optical filter 8 is disposed in front of the light receiving element 7. The optical filter 8 serves to prevent the occurrence of a shot noise caused by the incidence of direct light such as sunlight. The occurrence of the shot noise lowers a S-N ratio. The optical filter 8 prevents the incidence on the element 7 of light belonging to a wavelength range other than that of light emitted by the light emitting element 5. The light receiving element 7 photoelectrically transfers the light signal P. FIG. 2(b) shows a waveform of a current signal S1 transferred from the light signal P. The current signal S1 is transferred by an oscillation circuit 9 from current to voltage. FIG. 2(c) shows a waveform of an output voltage S2 transferred from the current signal S1. The oscillation frequency of the oscillation circuit 9 equals the frequency of a fundamental wave component of the light signal P of the light emitting portion. Therefore, a DC component and a higher harmonic wave component of the light signal P are eliminated, and accordingly only the fundamental wave component of the light signal P is transferred to a voltage signal. The oscillation circuit 9 is set to have a value of Q so as not to undergo the influence of the variation of a center frequency caused by environmental temperature. In FIGS. 2(b) and 2(c), noise components are omitted for convenience.

Figure 2D:
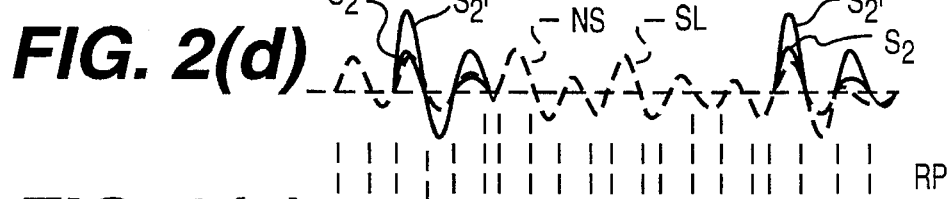
Figure 2E:
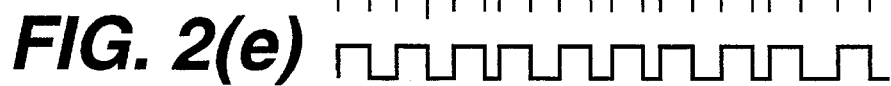

The output voltage S2 of the oscillation circuit 9 is input to an amplifier (amplifying circuit) 10 and is amplified thereby. The gain of the amplifier 10 is set so that an analog comparator (converter) 11, described hereinafter, can output a binary signal of 0 and 1 at random in accordance with internal noises included in, for example, the amplifier 10, when the light receiving element 7 does not receive the light signal P. In FIG. 2(d), reference character NS designates a noise occurring at random, and reference character S2' designates an output voltage in which the output voltage S2 is superimposed on the noise NS. Referring to FIG. 2(d), let it be supposed that the output voltage S2 is larger than the noise NS. An output voltage of the amplifier 10 is input to a plus (+) terminal 11a of the analog comparator 11, whereas an integral signal is input to a minus (−) terminal 11b of the analog comparator 11. The integral signal is obtained by integrating the output voltage of the amplifier 10 by a time constant sufficiently longer than the duration of the emission of the light signal P. Since the amplifier 10 is a non-inverting amplifier, the output signal of the analog comparator 11 always becomes 1 for the duration t (see FIG. 2(a)) of the emission of the light signal P (see FIG. 2(e)). Supposing that a threshold level determined by the input of the minus terminal 11b of the analog comparator 11 is SL, the output signal of the analog comparator 11 becomes a binary signal RP of 0 and 1, as shown in FIG. 2(e).

Figure 2F:
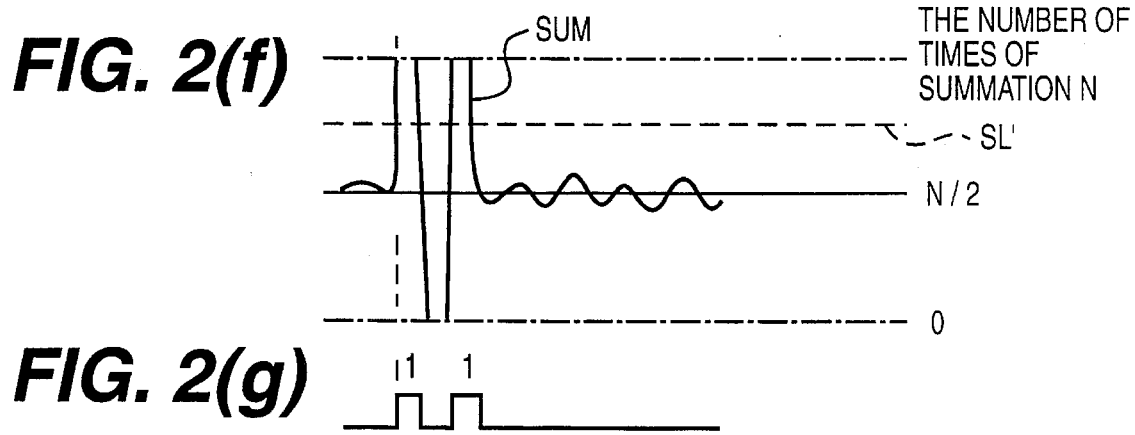
Figure 4A:
FIGS. 4(a)–4(g) are timing charts of the light signal detecting apparatus.
Figure 4B:
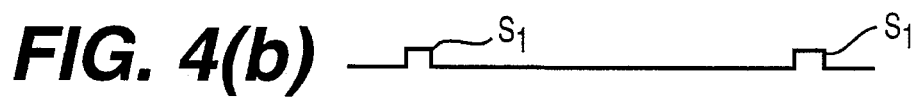
Figure 4C:
Figure 4D:
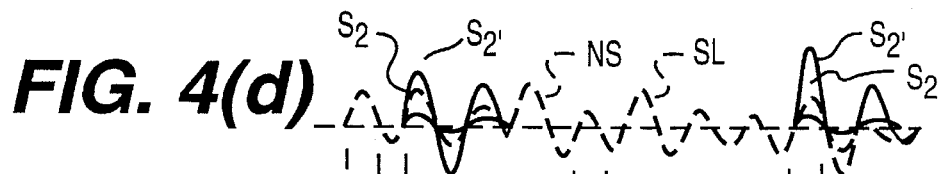
Figure 4E:
Figure 4F:
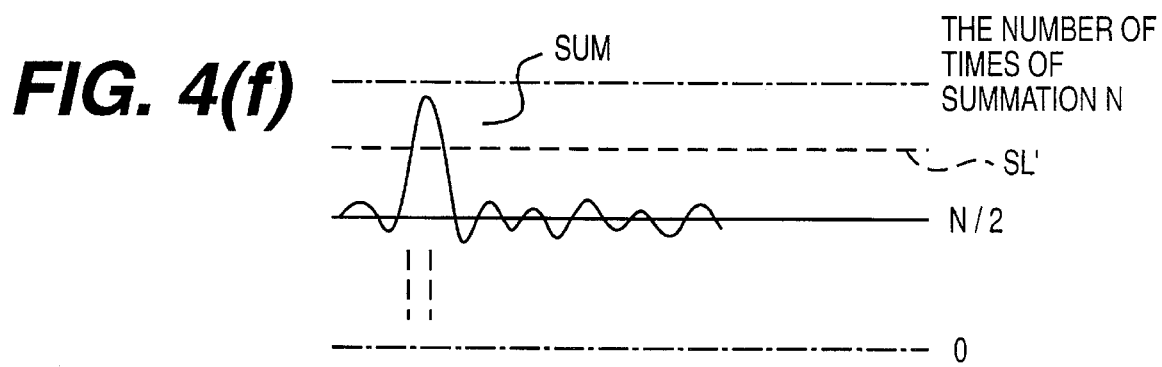

The binary signal RP of the analog comparator 11 is input to a summing circuit portion 12. The summing circuit portion 12 includes a crystal oscillator 13 as a second frequency source, an address counter 14, an adder 15, a random access memory (RAM) 16, and a reset circuit 17. The crystal oscillator 13 has the same frequency as that of the crystal oscillator 1 and is high-stable. The binary signal as data of the analog comparator 11 is input to the adder 15 and, in addition, data stored in each address of the random access memory (RAM) 16 is input thereto via the reset circuit 17. A period T is divided by the number (1000, for example) of the addresses of the random access memory 16. According to a reference clock signal of the crystal oscillator 13, the address counter 14 successively updates the addresses of the random access memory 16. An initial value of the data stored in each address of the random access memory 16 is 0. The adder 15 adds together the data stored in each address of the random access memory 16 and data output by the analog comparator 11, and then writes the resulting data to each address. In other words, the adder 15 adds together the data 0 stored in a first address and the data 0 or 1 output by the analog comparator 11, and then stores the resulting data in the first address. After that, the adder 15 adds together the data stored in a second address and the data output by the analog comparator 11 and stores the resulting data in the second address. In this manner, data is written to one thousand addresses, and thereby first summation is carried out. When completing the addressing of the thousand addresses, the address counter 14 again carries out the addressing of the random access memory 16 from the beginning. If synchronization (coincidence in phase) is brought about between the light emitting portion and the light receiving portion, the starting time of second summation coincides with the first address. In the second summation, the data stored in the first address is added to data output by the analog comparator 11, and the resulting data is stored in the first address. This summation procedure is carried out in respect of each address. The reset circuit 17 serves to prevent the input of data to the adder 15 during transmission of the summed data to a digital comparator 18, described hereinafter, after the summation is carried out predetermined times. The data stored in each address of the random access memory 16 is initialized simultaneously with the output of the summed data to the digital comparator 18, and then the next summation is carried out. Accordingly, the summing circuit portion 12 samples digital signals given from the converter synchronously with the second frequency source a plurality of times at regular intervals during one period T of the light signal P and then sums up values obtained in turn during the period T for a plurality of the periods of the light signal P in order to obtain a summed value. Supposing that the number of times of summation is N and the light signal P is not received, data of 0 or 1 is equally allocated to each address because the binary signal RP presumably occurs at random. In this case, the summed value SUM stored in each address converges on N/2 if N is made infinity. Next, supposing that the number of times of summation is N and the amplitude of the output voltage S2 is larger than that of the noise NS, a binary signal of 1 or 0 is generated in accordance with the plus or minus of the output voltage S2 for the time during which the output voltage S2 exists. As a result, the summed value SUM always becomes N or 0 for the existing duration of the output voltage S2. The summed value SUM converges on N/2, if N is made infinity, for the time during which the output voltage S2 does not exist (see FIG. 2(f)). Next, as shown in FIG. 4(d), in case of the noise NS being larger in amplitude than the output voltage S2, namely, in case of the output voltage S2 being drowned in the noise NS, the summed value SUM has a value between 2/N and N or a value between 0 and N/2 for the existing duration of the output voltage S2. The summed value SUM converges on N/2, as mentioned above, for the non-existing duration of the output voltage S2 if N is made infinity (see FIG. 4(f)).

Figure 4G:

In this manner, a summation result is stored in each address of the random access memory 16. The number of times of summation depends on the stability of the crystal oscillator 1 of the light emitting portion and the stability of the crystal oscillator 13 of the light receiving portion. Accordingly, the summation is carried out for the time during which the crystal oscillators 1 and 13 can be regarded as almost synchronous with each other. The data stored in each address of the random access memory 16 is input to the digital comparator 18. Only when it exceeds a threshold level SL', the digital comparator 18 outputs a signal ⌈1⌋ which denotes that the light signal P has been detected. On the other hand, when it is below the threshold level SL', the digital comparator 18 outputs a signal ⌈0⌋ which denotes that the light signal P has not been detected (see FIG. 2(g) or FIG. 4(g)).

Figure 2G:

If the light receiving element 7 receives a large quantity of light, a case occurs in which the output of the digital comparator 18 becomes ⌈1⌋, as shown in FIG. 2(g), even for the non-existing duration of the light signal P by a damping waveform of the oscillation circuit 9 because the oscillation circuit 9 is used as a load of the light receiving element 7. In this connection, signal processing may be carried out so as to input the output of the digital comparator 18 to a monostable multivibrator 18 capable of re-triggering and obtain one pulse per one light signal P. The re-trigger signifies a function by which, if a signal on a leading or trailing edge is input during the output of a pulse, the output pulse is prolonged for a fixed time from a point of time when the signal is input.

In this embodiment, it is omitted that the threshold level SL' is set between N (the number of times of summation) and N/2 and a summed value is divided by N. Since the number N of times of summation is a predetermined known constant and therefore the summed value detected before dividing it by the known constant leads to the same result, a dividing circuit is omitted to simplify a circuit configuration.

Further, in this embodiment, the analog comparator 11 is used to convert from analog to digital. Instead, an analog-to-digital converter may be used.

If a light pulse P is sampled at an interval much shorter than a pulse width of the light pulse P, its result becomes almost equal to a waveform of the light pulse P. The light pulse P is sampled during one period and converted from analog to digital, and then is stored in a memory whenever sampling is carried out. The number of addresses of the memory equals the number of times of sampling during the one period. The content of each address of the memory is initialized to ⌈0⌋ beforehand, or the content thereof is set not to be added in the first summation. Under this state, summation is carried out about every address of the memory. If there is no light pulse P, a signal is generated in which a noise component is superimposed on a bias component of the circuit. When taking an average, the random noise component is removed and, as a result, only the bias component appears. On the other hand, if there is a light pulse P, a signal based on the light pulse P can be made conspicuous because a signal waveform in which a component based on the light pulse P is added to the bias component is formed on average.

What is claimed is:

1. An apparatus for detecting a light signal, comprising:
    a first frequency source for generating a clock signal having a fixed frequency;
    a light emitting portion including a light emitting element driven periodically based on said clock signal of said first frequency source to emit a light signal; and
    a light receiving portion disposed apart from said light emitting portion;
    said light receiving portion comprising:
        a light receiving element that receives said light signal emitted from said light emitting element;
        an amplifying circuit that amplifies said light signal received by said light receiving element;
        a converter that converts an analog signal from said amplifying circuit into a digital signal;
        a second frequency source for generating a clock signal having a fixed frequency; and
        a summing circuit portion that samples, at regular intervals based on said clock signal from said second frequency source, said digital signal from said converter synchronously with said second frequency source a plurality of times during at least one period of said light signal, to obtain sampled values, each said sampled value having a number indicating a sampling order of the sampled value within a single period of the light signal, and summing the sampled values having matching numbers from other periods of the light signal.

2. An apparatus for detecting a light signal according to claim 1, wherein said converter is an analog comparator that converts an analog signal into a binary digital signal.

3. An apparatus for detecting a light signal according to claim 1, wherein said converter is an analog-to-digital converter.

4. An apparatus for detecting a light signal according to claim 1, wherein a frequency of said first frequency source is substantially the same as that of said second frequency source.

5. An apparatus for detecting a light signal according to claim 1, wherein said summing circuit portion comprises:
    an address counter that counts reference clock signals of said second frequency source and repeatedly updates addresses for each one of the plurality of the periods of the light signal;
    a random memory for repeatedly storing values based on addresses from the address counter; and
    an adder to which the values stored in addresses of said random memory and corresponding values of the digital signal output by said converter are input, said adder outputting addition data to the random memory, said addition data being obtained by adding together said random memory values and said digital signal values.

6. An apparatus for detecting a light signal according to claim 5, wherein said summing circuit portion includes a reset circuit for initializing the value stored in each address of said random memory when summation of said summing portion is completed a predetermined number of times.

7. An apparatus for detecting a light signal according to claim 1, further comprising a digital comparator that outputs information denoting that a light signal has been detected when the summed value exceeds a threshold level and outputs information denoting that the light signal has not been detected when the summed value is less than the threshold level.

8. An apparatus for detecting a light signal, comprising:
    a light emitting portion; and
    a light receiving portion disposed apart from said light emitting portion;
    said light emitting portion comprising:
        a first crystal oscillator that generates a clock signal having a fixed frequency;
        a counter circuit that divides said clock signal of said first crystal oscillator;
        an equal comparator that outputs a rectangular pulse when said counter circuit has counted to a predetermined value;
        a drive circuit to which said rectangular pulse is input; and
        a light emitting element that is driven periodically by said drive circuit to emit a light signal;
    said light receiving portion, comprising:
        a light receiving element that receives said light signal emitted from said light emitting element;
        an amplifying circuit that amplifies said light signal received by said light receiving element;
        a converter that converts an analog signal from said amplifying circuit into a digital signal;
        a second crystal oscillator that generates a clock signal having a fixed frequency; and
        a summing circuit portion that samples, at regular intervals based on said clock signal from said second frequency source, said digital signal from said converter synchronously with said second crystal oscillator a plurality of times during at least one period of said light signal and then sums sampled values obtained during each one of a plurality of periods of the light signal, the summing being performed according to a sampling order of the sampled values, said summing portion comprising:

an address counter that counts reference clock signals of said second crystal oscillator and, repeatedly updates addresses for each one of the plurality of the periods of the light signal;

a random memory for repeatedly storing values based on addresses from the address counter; and an adder to which the values stored in said random memory and values of the digital signal output by said converter are input, said adder outputting addition data obtained by adding together said random memory values and said digital signal values.

* * * * *